(12) United States Patent
Zohar

(10) Patent No.: US 8,265,599 B2
(45) Date of Patent: Sep. 11, 2012

(54) ENABLING AND CHARGING DEVICES FOR BROADBAND SERVICES THROUGH NEARBY SIM DEVICES

(75) Inventor: Tsaba Zohar, Kiryat Tivon (IL)

(73) Assignee: Intel Corporation, Santa, Clara, CA (US)

( * ) Notice: Subject to any disclaimer, the term of this patent is extended or adjusted under 35 U.S.C. 154(b) by 1100 days.

(21) Appl. No.: 12/127,812

(22) Filed: May 27, 2008

(65) Prior Publication Data

US 2009/0298467 A1 Dec. 3, 2009

(51) Int. Cl.
G06F 15/16 (2006.01)

(52) U.S. Cl. ........................................ 455/411; 455/558

(58) Field of Classification Search .................. 455/410, 455/411, 414.1, 552.1, 556.1, 558
See application file for complete search history.

(56) References Cited

U.S. PATENT DOCUMENTS

2008/0091824 A1* 4/2008 Patel et al. ..................... 709/225
2011/0184804 A1* 7/2011 Sontag et al. .............. 705/14.49

* cited by examiner

*Primary Examiner* — Sam Bhattacharya
(74) *Attorney, Agent, or Firm* — Pillsbury Winthrop Shaw Pittman LLP

(57) ABSTRACT

Embodiments relate to a method of access to wireless networks and/or network services, such as WiMAX, from a first wireless-enabled device, by sharing the credential of a second wireless-enabled device.

19 Claims, 2 Drawing Sheets

ENABLING AND CHARGING DEVICES FOR BROADBAND SERVICES THROUGH NEARBY SIM DEVICES

RELATED APPLICATION

None.

FIELD

Embodiments relate to system and method for use of a first wireless-enabled device with a wireless network or service requiring credentials stored on a SIM, by using the credentials from a second device having authorized credentials.

BACKGROUND

A Subscriber Identity Module ("SIM") is part of a removable smart card integrated circuit card, also known as a SIM card, for mobile cellular communication devices such as mobile phones and wireless-enabled mobile computers. The SIM card stores a variety of identification information accessed by the mobile device and/or communications network when the mobile device connects to the communications network. For instance, SIM cards securely store the International Mobile Subscriber Identity (IMSI), which is a service-subscriber key used to identify a subscriber. SIM cards also store network specific information used to authenticate and identify subscribers on the network, including the Integrated Circuit Card ID ("ICCID"), which is a serial number of the SIM card defined by the ITU-T recommendation E.118. The ICCID number is up to 18 digits long.

Other network-specific information that may be stored on a SIM card includes the International Mobile Subscriber Identifier ("IMSI"), which is a unique number associated with all GSM and Universal Mobile Telecommunications System (UMTS) network mobile phone users. The IMSI is sent by the phone to the network. It is also used to acquire other details of the mobile in the Home Location Register (HLR) or as locally copied in the Visitor Location Register. The IMSI is used in any mobile network that interconnects with other networks, in particular CDMA and EVDO networks as well as GSM nets. The IMSI is usually 15 digits long, but can be shorter, and includes the mobile subscriber identification number (MSIN) within the network's customer base.

Another important network-specific piece of information stored on the SIM card is the authentication key ("Ki"). The Ki is a 128-bit value used in authenticating the SIMs on the mobile network. Each SIM holds a unique Ki assigned to it by the operator during the personalization process. The Ki is also stored on a database (known as Authentication Center or AuC) on the carrier's network. The SIM card is not designed to allow the Ki to be obtained using the smart-card interface. Instead, the SIM card provides a function that allows the phone to pass data to the SIM card to be signed with the Ki. This, by design, makes usage of the SIM card mandatory unless the Ki can be extracted from the SIM card, or the carrier is willing to reveal the Ki.

Another important network-specific piece of information stored on the SIM card is the Location Area Identity (LAI), which provides network identification information. Operator networks are divided into Location Areas, each having a unique LAI number. When the device changes locations, it stores the new LAI in the SIM and sends it back to the operator network with its new location. If the mobile device is power cycled, the mobile device will read the previous LAI from the SIM and search for that LAI, thereby saving time in connecting to the network if the LAI has not changed.

The SIM also stores the Operator-Specific Emergency Number and carrier specific data such as the SMSC (Short Message Service Center) number, Service Provider Name (SPN), Service Dialing Numbers (SDN), Advice-Of-Charge parameters and Value Added Service (VAS) applications.

DETAILED DESCRIPTION

Figure 1:
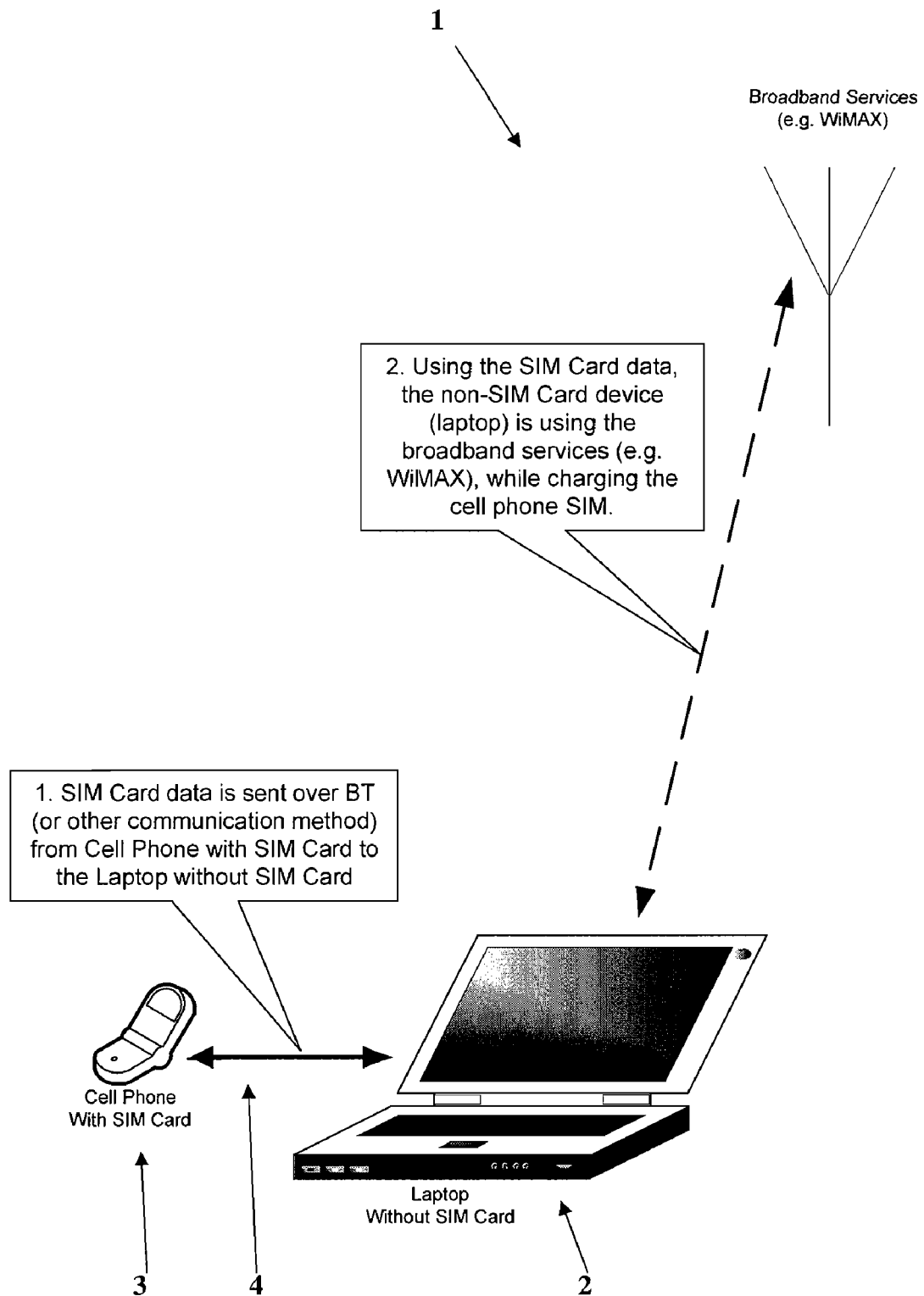
FIG. 1 shows a block diagram of a first embodiment of the invention;
having the SIM-enabled device near the non-SIM device.

The term "a" or "an" in the claims means "one or more." In the following description, numerous specific details are set forth. However, embodiments may be practiced without these specific details. In other instances, well-known circuits, structures and techniques have not been shown in detail in order not to obscure the understanding of this description.

Various wireless technologies are available for users, for instance: Worldwide Interoperability for Microwave Access ("WiMAX"), which is based on the IEEE 802.16 standard; third generation ("3G") of mobile phone standards and technology, based on the International Telecommunication Union (ITU) family of standards under IMT-2000; General Packet Radio Service ("GPRS"); WiFi based on IEEE 802.11a/b/g; Bluetooth (IEEE Standard 802.15.1), Zigbee (IEEE 802.15.4 standard), Ultra Wideband (UWB), or wireless USB. Some but not all wireless technologies require a SIM card for access to a network and network services. The SIM card provides authentication functions that ensure that the wireless device accessing the SIM card is authorized to use the wireless network or services. The authentication functions or their usage are referred herein as SIM-authentication. A wireless network requiring SIM-authentication is referred herein as a SIM-authenticated wireless network.

A user may have simultaneous access to more than one wireless-enabled device, some of which have a SIM card (i.e., a "SIM-enabled" device) and some of which do not have or do not require a SIM card (i.e., a "non-SIM device"). For instance, a user may have both a cell phone with a SIM card and a wireless-enabled laptop PC without a SIM card. The user may have access to the network or service that the user wants to use, but not on the device that the user wants to use. Embodiments are directed toward enabling a user of a first device enabled for wireless communications to be able to access and use an authenticated network or service associated with a second wireless device.

Embodiments include a method for accessing a SIM-authenticated wireless network, including transmitting a request for at least a portion of authentication credentials from a first wireless device, wherein the request is transmitted over a communications channel that does not require SIM-authentication; receiving the requested portion of authentication credentials by the first wireless device, wherein the requested portion of authentication credentials is received over the communications channel that does not require SIM-authentication; and using the requested portion of authentication credentials, by the first wireless device, to access the SIM-authenticated wireless network.

Optionally, the requested portion of authentication credentials are read from a SIM card used by a second wireless device that receives the request for a portion of authentication credentials.

Optionally, accessing the SIM-authenticated wireless network includes accessing a network service operated on the SIM-authenticated wireless network.

Optionally, accessing the network service is by using the authentication credentials transmitted from the second wireless device.

Optionally, the method may further including accessing a second network service by using a second set of authentication credentials.

Optionally, the communications channel that does not require SIM-authentication is based on technology selected from the group consisting of IEEE 802.11, IEEE 802.15.1, IEEE 802.15.4, infrared, ultrasonic, acoustic and USB.

Optionally, the communications channel that does not require SIM-authentication is an Ethernet communications channel.

Optionally, the requested portion of authentication credentials is read from a SIM-authentication server.

Optionally, this embodiment may further include disconnecting after a predetermined time the first wireless device from the SIM-authenticated wireless network; and relinquishing usage of the requested portion of authentication credentials by the first wireless device.

Optionally, the method further includes terminating network services accessed by the first wireless device on the SIM-authenticated wireless network, without loss of user data.

Another embodiment is a method for accessing a SIM-authenticated wireless network, including transmitting access data from a wireless device to a SIM-enabled device, wherein the request is transmitted over a communications channel that does not require SIM-authentication; receiving transformed data from the SIM-enabled device, wherein the transformed data has been authenticated by the SIM-enabled device, and is received over the communications channel that does not require SIM-authentication; and transmitting the transformed data to the SIM-authenticated wireless network, wherein the transformed data is authenticated by the SIM-authenticated wireless network.

Another embodiment is a system for accessing a SIM-authenticated wireless network, including a wireless device having a first communication interface configured to transmit to the SIM-authenticated wireless network, and a second communication interface configured to communicate with a communications channel, wherein the communications channel is not the SIM-authenticated wireless network; and SIM-enabled device having a communication interface configured to communicate with the wireless device over the communications channel, wherein the SIM-enabled device has access to SIM credentials, wherein the SIM credentials are used to adapt data sent by the wireless device to access the SIM-authenticated wireless network.

Optionally, the system includes the wireless device receiving SIM credentials from the SIM-enabled device, and the wireless device adapts data using the SIM credentials.

Optionally, the system includes the wireless device transmitting unauthenticated data to the SIM-enabled device, and receiving adapted data from the SIM-enabled device.

Optionally, the SIM-enabled device is a SIM credentials server, and the communications channel is an Ethernet connection.

Optionally, the SIM-enabled device is a cell phone, and the communications channel is based on technology selected from the group consisting of IEEE 802.11, IEEE 802.15.1, IEEE 802.15.4, infrared, ultrasonic, acoustic and USB.

Embodiments are directed to enabling the transfer between two or more wireless-enabled devices of the information stored on one or more SIM cards within the wireless-enabled devices, without the need for physical transfer of the SIM cards, so that network access or services may be used on one wireless-enabled device while charging the cost of that access or service to a second wireless-enabled device.

A user may have simultaneous access to more than one wireless-enabled device, some of which are SIM-enabled and some of which are a non-SIM device. For instance, a user may have both a cell phone with a SIM card and a wireless-enabled laptop PC without a SIM card. The user may have access to the network or service that the user wants to use, but not on the device that the user wants to use.

Alternatively, the user may have access to more than one wireless device, each with its own SIM containing different identification and credentials. The devices may be permitted to access different sets of networks or network services. For instance, device "1" may be permitted to access network "A" or service "Z", but not network "B" or service "Y"; conversely, device "2" may be permitted to access network "B" or service "Y", but not network "A" or service "Z." The reasons for denial of permission may be, for instance, that the user has purchased access to network "A" only for device "1" and not device "2", or that service "Y" has been purchased on a pre-paid basis, and the user's account with service "Y" on device "1" has fallen to zero. Again, the user may have access to the network or service that the user wants to use, but not on the device that the user wants to use.

As used herein, "non-SIM device" encompasses either a device without a SIM card; or a device that may have a SIM card physically or electrically attached, but the SIM card does not have sufficient credentials or permissions to access the network or network services that the user of the non-SIM device wants to use. Permissions may be based, for instance, on the content of the access sought, or the user's remaining account value on a pre-paid basis, etc.

SIM cards allow users to change wireless-enabled devices by simply removing the SIM card from one wireless-enabled device and inserting it into another wireless-enabled device, as long as the interface and form factors for SIM cards required by the two wireless-enabled devices are compatible. However, this would not be feasible if one of the user's wireless-enabled devices is a non-SIM device. Even if an exchange of SIM cards is feasible, it would be desirable from the user's standpoint to avoid physical changes by having the ability to swap or to temporarily use the SIM network access information from one wireless-enabled device in a second wireless-enabled device.

In another scenario, a user may have a first wireless-enabled device (e.g., a notebook PC or desktop PC) that is non-SIM but enabled with WiMAX or other cellular technology that requires access to a network and/or network services, generally operated by a third party, wherein access to the network and/or network services requires a payment (e.g., monthly/daily fee, or pre-paid fees, or per-MB data charge), or the usage of an allocation (e.g., minutes, or maximum monthly data transfer), the allocation being associated with a payment. Gaining access to the network and/or network services may require procedural steps that cannot be completed in as short a time frame as the user of the first wireless-enabled device may prefer, for instance, a subscriber agreement may be necessary, or credit check, etc. However, the user may have access to a second wireless-enabled device (e.g., a nearby SIM-enabled cell phone) that has already been set up for access to the network and/or network services that the user wants to use on the first. It would be desirable for the user to be able to access the network and/or network services through the first, non-SIM device by using the credentials (i.e., the identification, access permissions, billing information, etc) from the second, SIM-enabled device.

Embodiments enable the transfer of identification and other SIM information (collectively, "credentials") from the SIM-enabled device to the non-SIM device. The credentials transfer is preferably encrypted, and may be by any communication apparatus, e.g., bluetooth ("BT"), infrared link, ultrasonic, acoustic, USB, etc. A BT link has the additional advantage that BT is readily available for both cell phones and laptop PCs, so no additional hardware is required.

When the non-SIM device receives the credentials, it is able to use the network and/or network services, and the operator of the network and/or network services can charge the cost of that usage to the SIM-enabled device. Therefore, users of non-SIM devices can use the network and/or network services without the need for a separate subscriber agreement, etc., for the non-SIM device. The cost of access or usage is charged to an account associated with the SIM-enabled device.

If a network interface is already available to both the non-SIM device and the device having the credentials (e.g., WiFi or wired Ethernet), the credentials may be transferred via the already-available network interface. For instance, if a BlackBerry (i.e., a SIM-enabled device) and a laptop (a non-SIM device) are connected to the same WiFi network, credentials may pass over the WiFi network. If the credentials are needed in order to obtain network access, then the network interface used to transfer credentials must be separate from the network access sought. If the credentials are needed in order to obtain access to a network service over an already-established network connection, then the credentials should provide at least enough access for both the existing network connection and the network service that is sought.

Persons of ordinary skill in the art will realize that the transferred credentials will be stored within a portion of the memory of the non-SIM device, and that the operating system should be configured to access transferred credentials within memory as if the credentials were stored on a SIM card physically and electrically connected to the non-SIM device. The operating system may be, for instance: Microsoft Windows™, a Macintosh operating system, Unix, Linux, or a proprietary operating system. Persons of ordinary skill in the art will realize that configuring the operating system may be, for instance, by installing driver software that manages access to SIM data stored in the memory of the non-SIM device.

Optionally, transfer of credentials between SIM-enabled and non-SIM wireless devices may include steps that disconnect the SIM-enabled wireless device from the network and/or network services, in a way that is not disruptive to the user (i.e., a graceful disconnect), prior to the use of those credentials by the non-SIM wireless device. When the non-SIM wireless device is finished using the credentials, it gracefully disconnects from the network and/or network services before the credentials can be used again by the SIM-enabled device.

The SIM-enabled device may remain functional for any applications that do not require access to the credentials, during the time that credentials are transferred. For instance, if credentials are transferred from a cell phone SIM-enabled device to a non-SIM laptop in order for the laptop to access a wireless internet service, the cell phone may remain enabled for WiFi access and local application software such as calendar software, games, etc.

In another embodiment of the present invention, at least a portion of the credentials remain stored in the SIM-enabled device. The portion may include, for instance, the authentication key "Ki". When the non-SIM device wishes to use the network or network services that requires credentials, the non-SIM device accesses that portion of credentials over a communications link with the SIM-enabled device. Processing functions related to access and authentication that are performed using the portion of credentials within the SIM card continue to be performed by the SIM-enabled device. Any data required by the processing functions in the SIM card is transmitted to the SIM-enabled device over the communications link. Results from any processing functions which are needed by the non-SIM device to access the network and/or network functions are transmitted over the communications link from the SIM-enabled device to the non-SIN device. In this way, at least a portion of the credentials within the SIM card remain within the SIM-enabled device at all times.

In another embodiment of the invention, a user has access to device "1" and device "2". Device "1" has a first set of credentials that enable access to network "A" to run service "Z" but not service "Y". Device "2" has a second set of credentials that enable access to run at least service "Y". Device "1" may obtain the second set of credentials from device "2" over a communications link between devices "1" and "2", so that device "1" uses the first set of credentials to run service "Z" and the second set of credentials to run service "Y".

In another embodiment of the invention, the credentials are stored within a credentials server. When a non-SIM device requests access to a network and/or network services that requires credentials, it can access the credentials from the credentials server over a network interface. In this way, the credentials server can be physically remote from the non-SIM device. Furthermore, a probabilistic methodology can be used to support a greater number of non-SIM wireless devices than there are SIM-enabled devices. Such probabilistic methodology is known from fields such as circuit-switched communication network design, or applications such as network-enabled software licenses. Applications may include, for instance, a traveling sales force each having a laptop that requires access to a wireless network service, but not all salesmen are traveling at the same time.

FIG. 1 illustrates an embodiment of the present invention, system 1, wherein the laptop 2 is a non-SIM device but cell phone 3 is SIM-enabled. Cell phone 3 is able to transmit its SIM data credentials over a communications link 4 to the laptop 2 so that the laptop 2 can use the credentials in order to access WiMAX or other networks and/or network services that require credentials.

Figure 2:
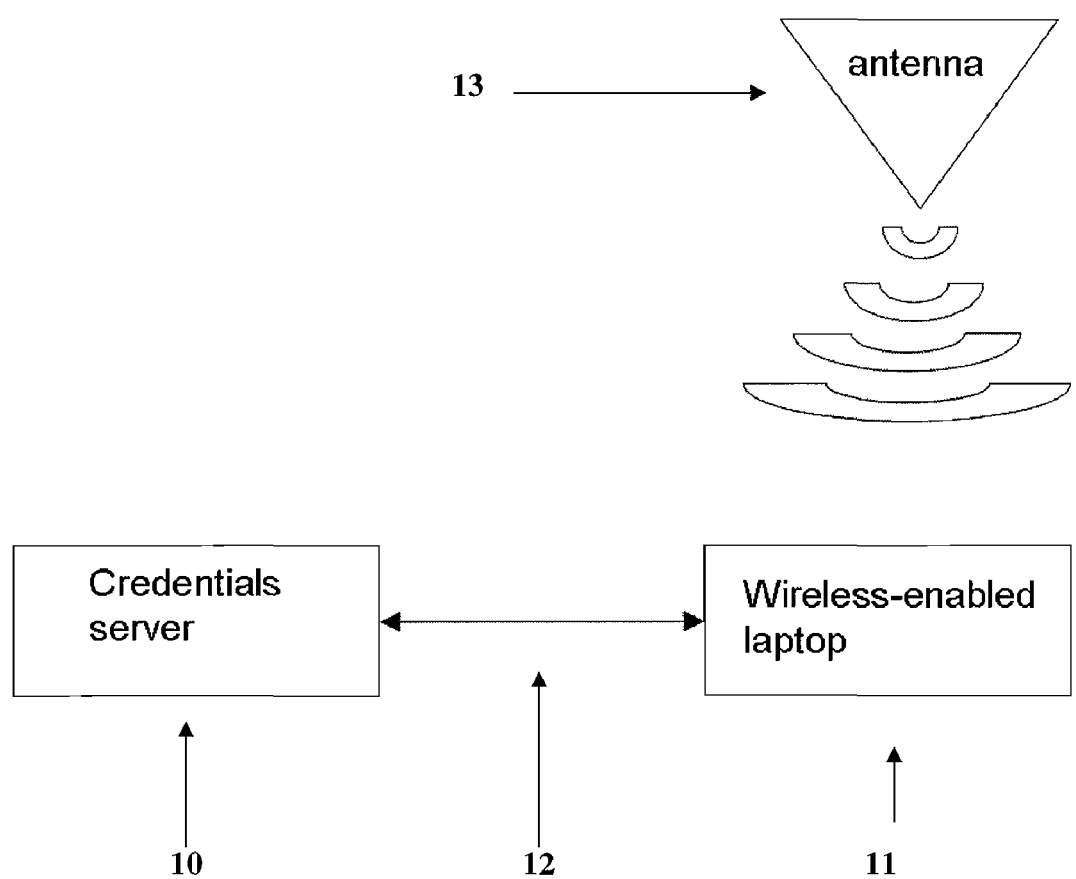
FIG. 2 shows a block diagram of a second embodiment of the invention; having a credentials server provide credentials to the non-SIM device

FIG. 2 illustrates an alternate embodiment, wherein a credentials server 10 stores sets of credentials. Laptop 11 requests credentials over network connection 12 in order to gain access to a network and/or network service, represented by access through antenna 13. Network connection 12 may be, for instance, an Ethernet connection.

This application may disclose several numerical range limitations that support any range within the disclosed numerical ranges even though a precise range limitation is not stated verbatim in the specification because the embodiments could be practiced throughout the disclosed numerical ranges. Finally, the entire disclosure of the patents and publications referred in this application, if any, are hereby incorporated herein in entirety by reference.

The invention claimed is:

1. A method, comprising:
transmitting, from a first wireless device over a communications channel that does not require SIM-authentication, a request for at least a portion of an authentication credential to access a SIM-authenticated wireless network;
receiving the requested portion of the authentication credential by the first wireless device; and
accessing the SIM-authenticated wireless network using the requested portion of the authentication credential.

2. The method of claim 1, further comprising reading the requested portion of the authentication credential from a SIM card used by a second wireless device that receives the request for a portion of the authentication credential.

3. The method of claim 1, wherein accessing the SIM-authenticated wireless network includes accessing a network service operated on the SIM-authenticated wireless network.

4. The method of claim 3, wherein, accessing the network service is by using the requested portion of the authentication credential transmitted from a second wireless device.

5. The method of claim 4, further comprising accessing a second network service by using a second portion of an authentication credential.

6. The method of claim 1, wherein the communications channel that does not require SIM-authentication is based on technology selected from the group consisting of IEEE 802.11, IEEE 802.15.1, IEEE 802.15.4, infrared, ultrasonic, acoustic and USB.

7. The method of claim 1, wherein the communications channel that does not require SIM-authentication is an Ethernet communications channel.

8. The method of claim 7, wherein the requested portion of authentication credential is read from a SIM-authentication server.

9. The method of claim 1, further comprising:
disconnecting after a predetermined time the first wireless device from the SIM-authenticated wireless network; and
relinquishing usage of the requested portion of the authentication credential by the first wireless device.

10. The method of claim 9, further including: terminating network services accessed by the first wireless device on the SIM-authenticated wireless network, without loss of user data.

11. A method, comprising:
transmitting access data from a wireless device to a SIM-enabled device, over a communications channel that does not require SIM-authentication;
receiving, at the wireless device, transformed data authenticated by the SIM-enabled device; and
accessing a SIM-authenticated wireless network using the transformed data.

12. The method of claim 11, wherein the transformed data is received over the communications channel that does not require SIM-authentication, prior to accessing the SIM-authenticated network.

13. A system, comprising:
a wireless device having a first communication interface configured to communicate with a SIM-authenticated wireless network, and a second communication interface configured to communicate over a communications channel that is different than a channel used for communicating with the SIM-authenticated wireless network, wherein the wireless device is configured to transmit a request over the communication channel for a SIM credential to access the SIM-authenticated wireless network; and
a SIM-enabled device having a communication interface configured to communicate with the wireless device over the communications channel, wherein the SIM-enabled device has access to the SIM credential that is used by the wireless device to access the SIM-authenticated wireless network.

14. The system of claim 13, wherein the wireless device receives the SIM credential from the SIM-enabled device, and the wireless device adapts data using the SIM credential.

15. The system of claim 13, wherein the wireless device transmits unauthenticated data to the SIM-enabled device, and receives adapted data from the SIM-enabled device.

16. The system of claim 13, wherein the SIM-enabled device is a SIM credential server, and the communications channel is an Ethernet connection.

17. The system of claim 13, wherein the SIM-enabled device is a cell phone, and the communications channel is based on technology selected from the group consisting of IEEE 802.11, IEEE 802.15.1, IEEE 802.15.4, infrared, ultrasonic, acoustic and USB.

18. The method of claim 1, wherein the accessing the SIM-authenticated wireless network using the requested portion of the authentication credential is done by the first wireless device.

19. The method of claim 1, wherein the accessing the SIM-authenticated wireless network using the requested portion of the authentication credential is done by a second wireless device that is different from the first wireless device.

* * * * *